United States Patent
Asher et al.

(10) Patent No.: US 11,170,630 B2
(45) Date of Patent: Nov. 9, 2021

(54) AUDIO CONDITIONING CHIMES

(71) Applicant: BOSE CORPORATION, Framingham, MA (US)

(72) Inventors: David Asher, Milford, MA (US); Todd Reily, North Reading, MA (US)

(73) Assignee: BOSE CORPORATION, Framingham, MA (US)

( * ) Notice: Subject to any disclaimer, the term of this patent is extended or adjusted under 35 U.S.C. 154(b) by 182 days.

(21) Appl. No.: 16/528,131

(22) Filed: Jul. 31, 2019

(65) Prior Publication Data

US 2021/0035434 A1 Feb. 4, 2021

(51) Int. Cl.
*G08B 21/24* (2006.01)
*G10L 15/00* (2013.01)
*G08B 3/10* (2006.01)

(52) U.S. Cl.
CPC ........... *G08B 21/24* (2013.01); *G08B 3/1016* (2013.01); *G10L 15/00* (2013.01)

(58) Field of Classification Search
CPC ........ G08B 21/24; G08B 3/1016; G10L 15/00
See application file for complete search history.

(56) References Cited

U.S. PATENT DOCUMENTS

| | | | | |
|---|---|---|---|---|
| 8,983,505 B1* | 3/2015 | Oroskar | ............... | H04W 68/005 455/458 |
| 2009/0131119 A1* | 5/2009 | Chang | .................... | G10H 7/002 455/567 |
| 2010/0151821 A1* | 6/2010 | Sweeney | ................. | H04W 4/02 455/410 |
| 2015/0046267 A1* | 2/2015 | MacTiernan | .......... | G06F 16/635 705/14.66 |
| 2015/0348377 A1* | 12/2015 | Kauffmann | ......... | G06F 3/04842 340/384.5 |

* cited by examiner

*Primary Examiner* — Joseph H Feild
*Assistant Examiner* — Sharmin Akhter
(74) *Attorney, Agent, or Firm* — Patterson + Sheridan, LLP

(57) ABSTRACT

Aspects provide methods to discretely and intelligently make a user aware of a service or product offered by a subscriber without distracting the user with a full advertisement. More specifically, aspects provide methods and systems for selectively outputting an audio chime in response to a trigger event, wherein the audio chime provides an indication of a service or product offered by the subscriber. In response to a user's acceptance of the audio chime, a second chime, further engaging the user, is output.

21 Claims, 2 Drawing Sheets

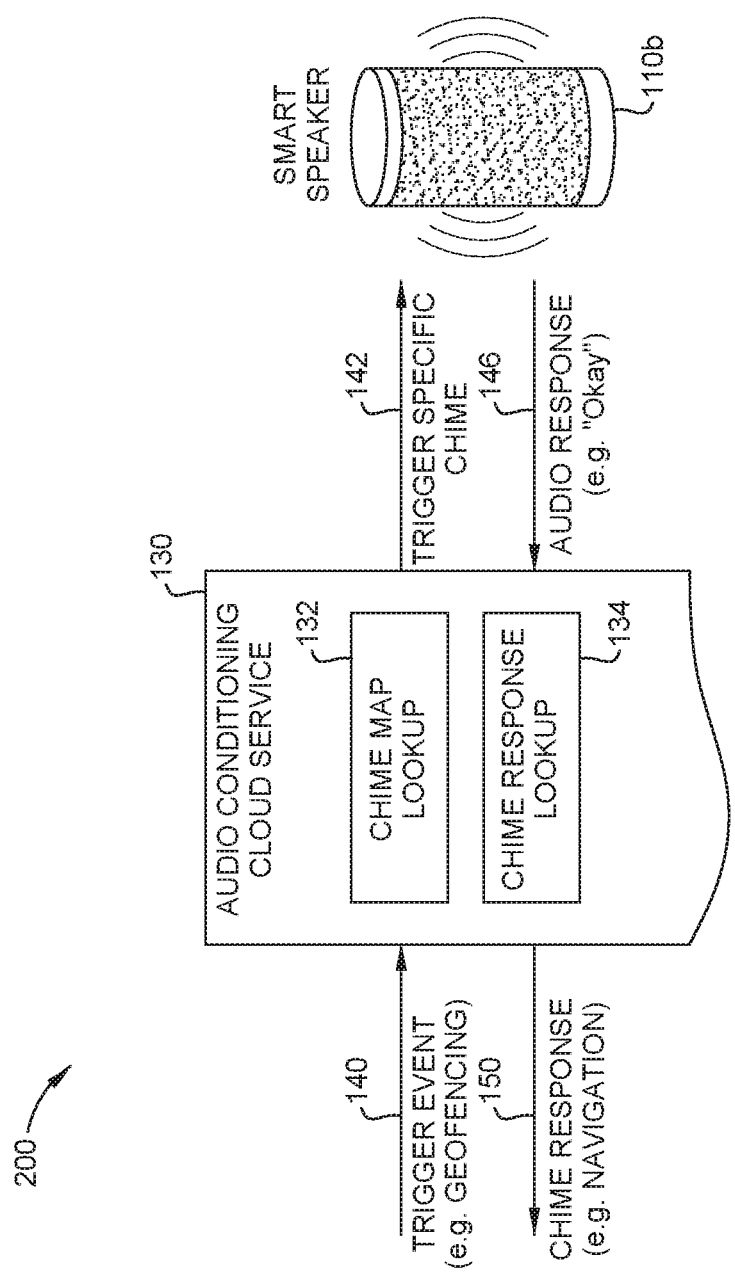

AUDIO CONDITIONING CHIMES

FIELD

Aspects of the disclosure generally relate to intelligently making a user aware of a service or product without distracting the user with a full advertisement. More specifically, aspects provide methods and systems for selectively outputting an audio chime, wherein the audio chime provides an indication of a service or product offered by a subscriber. As described, the audio chime is output in response to a trigger event.

BACKGROUND

Physiologist Ivan Pavlov found that dogs salivated in response to food, but that the dogs also began to salivate when they saw the lab assistant who delivered the food. In this example, a previously neutral stimulus (the lab assistant) became associated with an unconditioned stimulus (the food) that naturally triggered a response (salivating). After the neutral stimulus became associated with the unconditioned stimulus, the neutral stimulus became a conditioned stimulus capable of triggering the conditioned response all on its own.

Understanding consumer behavior can help providers of services or products understand how consumers think and make decisions. Applying Pavlov's findings to consumer behavior suggests that an unconditioned stimulus that results in a consumer's response can be associated with a new, conditioned stimulus bringing about the same response. As the number of internet-connected devices increases, consumers are bombarded with advertisements. Methods and systems to discretely and effectively alert a consumer of available services or products are desirable.

SUMMARY

All examples and features mentioned herein can be combined in any technically possible manner.

Aspects provide a computer-readable medium storing instructions which, when executed by at least one processor on an audio output device, cause the audio output device to perform a method comprising: receiving an indication to output an audio chime in response to a trigger event, wherein the audio chime provides an indication of a service or product offered by a subscriber, outputting the audio chime, receiving, from a user of the audio output device, acceptance of the audio chime, and transmitting an indication of the acceptance, wherein transmitting the indication of the acceptance triggers action further engaging the user with the service or product associated with the accepted audio chime.

In aspects, the audio output device receives the indication to output the audio chime from a user device in communication with the audio output device.

According to aspects, the trigger event occurs when the user enters a geofence that surrounds an area of interest associated with the subscriber. According to aspects, the trigger event is predetermined by one of the subscriber or a time of day. According to aspects, the trigger event is initiated by a second user interacting with the user through computer-mediated communication.

According to aspects, the acceptance comprises one of a verbal acceptance, user interaction with the user device, or user interaction with the audio output device.

According to aspects, the subscriber is associated with multiple audio chimes, wherein the multiple audio chimes include the audio chime and the audio chime further provides an identifier associated with the subscriber. According to aspects, the audio chime is played before a second audio chime of the multiple audio chimes, and the second audio chime provides more specific information associated with the service or product offered by the subscriber as compared to the audio chime.

According to aspects, the instructions further cause the audio output device to output an audio chime response, wherein the audio chime response comprises an audio output response that further engages the user with the service or product associated with the accepted audio chime.

According to aspects, at least one of the audio chime or the audio chime response comprises a spatialized sound generating a perception of the audio chime or the audio chime response being heard from a distance or direction with respect to the user based on information to be conveyed to the user.

Aspects provide a computer-readable medium storing instructions which when executed by at least one processor on an audio output device cause the audio output device to perform a method comprising receiving, from a network, an indication to output an audio chime in response to a trigger event, wherein the audio chime provides an indication of a service or product offered by a subscriber, outputting the audio chime, receiving, from a user, acceptance of the audio chime, and transmitting, to the network, an indication of the acceptance, wherein transmitting the indication of the acceptance triggers action further engaging the user with the service or product associated with the accepted audio chime.

According to aspects, the trigger event is predetermined by one of the subscriber, a time of day, or the user entering a geofence that surrounds an area of interest associated with the subscriber. According to aspects, the trigger event is initiated by a second user interacting with the user through computer-mediated communication. According to aspects, the acceptance comprises one of a verbal acceptance or user interaction with the audio output device.

According to aspects, the subscriber is associated with multiple audio chimes, wherein the multiple audio chimes include the audio chime and the audio chime further provides an identifier associated with the subscriber. According to aspects, the audio chime is played before a second audio chime of the multiple audio chimes, and the second audio chime provides more specific information associated with the service or product offered by the subscriber as compared to the audio chime.

According to aspects, the instructions further cause the audio output device to, in response to the acceptance, output an audio chime response, wherein the audio chime response comprises an audio output response that further engages the user with the service or product associated with the accepted audio chime.

According to aspects, at least one of the audio chime or the audio chime response comprises a spatialized sound generating a perception of the audio chime or the audio chime response being heard from a distance with respect to the audio output device based on information to be conveyed.

According to aspects, the instructions further cause the audio output device to, after outputting the audio chime, begin a response timer and receiving acceptance of the audio chime in a time defined by the response timer.

According to aspects, outputting at least one of the audio chime and the audio chime response comprises outputting the audio chime or the audio chime response while simultaneously outputting an audio stream.

Aspects provide a method comprising providing an application on a user device communicatively coupled to an audio output device, the application configured to receive, from a network, an indication to output an audio chime in response to a trigger event, wherein the audio chime provides an indication of a service or product offered by a subscriber, outputting, by the audio output device, the audio chime, receiving, from a user of the audio output device, acceptance of the audio chime, in response to acceptance of the audio chime by the user, and transmitting, by the application to the network, an indication of the acceptance, wherein transmitting the indication of the acceptance triggers action further engaging the user with the service or product associated with the accepted audio chime.

According to aspects, the method further comprises, in response to the acceptance, receiving from the network, an indication of an audio chime response and outputting, by the audio output device, the audio chime response in response to the received indication of the audio chime response, wherein the audio chime response comprises an audio output that further engages the user with the service or product associated with the accepted audio chime.

According to aspects, the audio chime and the audio chime response both comprise sounds predetermined by the subscriber.

According to aspects, the method further comprises outputting, by the audio output device, an audio stream at a first sounds pressure level (SPL), simultaneously outputting the audio stream at a second, reduced SPL and the audio chime, and outputting the audio stream at the first SPL after outputting the audio chime.

According to aspects, the audio output device is incorporated in a smartphone.

BRIEF DESCRIPTION OF THE DRAWINGS

FIGS. 1 and 2 illustrate example systems in which aspects of the present disclosure may be practiced.

DETAILED DESCRIPTION

Figure 1:
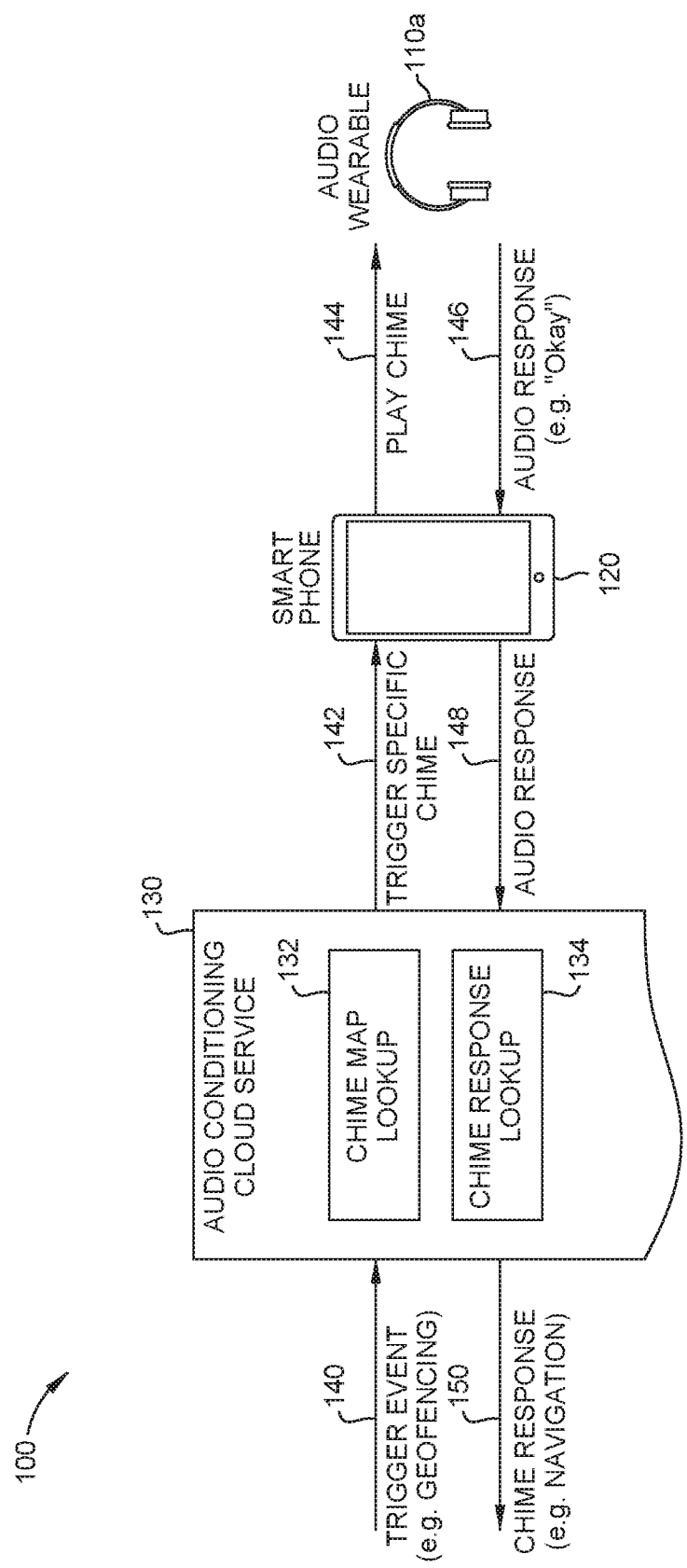

Aspects of the present disclosure provide methods and systems to selectively and subtly alert a user (e.g., customer) that a product or service is available. Specifically, a user is conditioned to associate a received stimulus (e.g., audio chime) with a product or service offered by a subscriber.

Human ears can discriminate between a wide range of triggers in a short period of time. Accordingly, audio chimes help create targeted experiences for a user, wherein the user recognizes a sound, differentiates the sound from others sounds, associates the sound with a provider (e.g., subscriber) of a product or service, and decides if he is interested in engaging with the provider. In aspects, in an effort to create a stronger or more immediate association between the chime and the products or services provided, a subscriber uses chime in many places. As an example, the subscriber may play the audio chime in commercials or in-store advertisements.

As described herein, a subscriber refers to an entity offering products or services to a user or customer. In an example, a subscriber is a business. In aspects, a subscriber defines a trigger event. Various trigger events will be described in more detail below including, for example, geofencing, a package arriving at a user's home, a sale occurring at a store of interest to the user, and an individual engaging with the user via computer-mediated communication. Occurrence of a trigger event causes output of a chime by an audio output device. A chime refers to an audio output which serves as an indication of products or services offered by the subscriber. In aspects, the chime is developed by the subscriber.

In aspects, a user accepts the chime. By accepting the chime, the user indicates that he is interested in further engaging with the products or services offered by the subscriber. A second chime (chime response) is triggered in response to the user's acceptance of a chime. A chime response further engages the user with the products and services provided by the subscriber. In aspects, the chime response provides additional information to further engage the user. The chime response may be an audio output by the audio output device, a push notification to a user device, or any other output that further engages the user with the subscriber.

FIGS. 1 and 2 illustrates example systems 100, 200 in which aspects of the present disclosure may be practiced. In FIG. 1, a wearable audio output device 110*a* is communicatively coupled with a portable user device 120. Further, in FIG. 1, the user device 120 accesses a cloud service 130 using a mobile web browser or a local software application ("app") executed on the user device 120. As used herein, a cloud service refers to a service made available to users via the Internet from a cloud computing provider's servers as opposed to a subscriber's own servers.

The wearable audio output device 110*a* refers to any audio output device including, for example, over-the-ear headphones, audio eyeglasses or frames, in-ear buds, around-ear audio devices, open-ear audio devices (such as head-worn, shoulder-worn or body-worn audio devices), audio masks, audio wrist watches, or the like. The audio output device 110*a* may rely on the user device 120 in order to access the cloud service 130.

The wearable audio output device 110*a* includes at least one acoustic transducer (also known as driver or speaker) for outputting sound. In the wearable audio output device 110*a*, the acoustic transducer(s) may be configured to transmit audio through air and/or through bone (e.g., via bone conduction, such as through the bones of the skull). In an aspect, the device 110*a* includes one or more microphones to detect sound/noise in the vicinity of the respective device to enable active noise reduction (ANR). Additionally or alternatively, the wearable audio output device 110*a* includes one or more of a button, a capacitive sensor with gesture recognition, or an inertial measurement unit (IMU) with gesture recognition. The button is pressed, tapped, or otherwise engaged by the user to indicate acceptance of the audio chime. The capacitive sensor and IMU are each configured to recognize gestures such as a tap or swipe on the audio output device. In aspects, a user accepts the audio chime by an interaction with the user device 120. The audio chime may be accepted by pressing a button on the user device 120 or on a touch screen of the user device 120, by shaking the user device 120, or by some other user interaction.

In aspects, the device 110*a* includes hardware and circuitry including processor(s)/processing system and memory configured to implement one or more sound management capabilities or other capabilities including, but not limited to, noise cancelling circuitry and/or noise masking circuitry, geolocation circuitry, and other sound processing circuitry. The noise cancelling circuitry is configured to reduce unwanted ambient sounds external to the audio device by using active noise cancelling. The sound masking circuitry is configured to reduce distractions by playing masking sounds via the speakers of the audio device. The movement detecting circuitry (which may include one or more of: an accelerometer, gyroscope, and magnetometer) is configured to detect a head orientation of the user for use in processing spatial audio, or augmented reality (AR) applications where an AR sound is played back based on a direction of gaze of the user. The geolocation circuitry is configured to detect a physical location of the wearable audio output device 110a. In an example, the physical location is determined using geolocation circuitry. The circuitry may include Global Positioning System (GPS) antenna and related circuitry to determine GPS coordinates of the user wearing the audio device. In aspects, a wearable audio output device 110a includes body movement detecting devices/sensors and circuitry (e.g., one or more accelerometers, one or more gyroscopes, one or more magnetometers, etc.).

In an aspect, the wearable audio output device 110a is wirelessly connected to the user device 120 using one or more wireless communication methods including, but not limited to, Bluetooth, Wi-Fi, Bluetooth Low Energy (BLE), other radio frequency (RF)-based techniques, or the like. In an aspect, the wearable audio output device 110a includes a transceiver that transmits and receives information via one or more antennae to exchange information with the user device 120.

In an aspect, the wearable audio output device 110a may be connected to the user device 120 using a wired connection, with or without a corresponding wireless connection. In FIG. 1, the user device 120 is connected, via the Internet, to a cloud service 130.

The user device 120 is representative of a variety of computing devices, such as mobile telephone (e.g., smartphone) or a computing tablet. In an aspect, the user device 120 may access the cloud service 130 in the cloud using a mobile web browser or a local software application ("app") executed on the user device 120. In an aspect, the software application or "app" is a local application that is installed and runs locally on the user device 120. In an aspect, a cloud service accessible on the cloud includes one or more cloud applications that are run on the cloud service The cloud application may be accessed and run by the user device 120. For example, the cloud application may generate web pages that are rendered by the mobile web browser on the user device 120. In an aspect, a mobile software application installed on the user device 120 and a cloud application installed on a cloud service, individually or in combination, may be used to implement the techniques for outputting an audio chime and taking further action based on a user's acceptance of the audio chime.

A subscriber provides the association of the subscriber, trigger event, and chime to the cloud service 130. The cloud service 130 accepts the subscriber, the trigger event, and the chime and stores the association between the subscriber, trigger, and chime in a database or table 132 that is referenced when a trigger event occurs. Table 132 may be referred to as the chime map lookup table. The subscriber also defines how a user accepts a chime and the corresponding action that is triggered upon the user's acceptance of the chime. The cloud service 130 stores the association between the subscriber, user's acceptance of a chime, and the chime response in a database or table 134. Table 134 may be referred to as the chime response lookup table.

In aspects, a user subscribes to or otherwise opts-in to receive a notification chime from a subscriber. For illustrative purposes, a user may choose to receive chimes from his favorite online or brick-and-mortar stores, streaming media providers, social media providers, or service providers. According to one example, the user subscribes to receiving a chime from a particular subscriber using an application running on the user device 120.

At 140, a trigger event occurs. A trigger event may occur based on a physical location of the user. In one example, a trigger event occurs when the user is within a certain distance of the subscriber's store. A subscriber may have a geofence that surrounds an area of interest associated with the subscriber. In one example, the geofence marks one-thousand feet around one of the subscriber's stores. A trigger event may occur when the user wearing the wearable audio output device 110a enters the geofence. At least one of the wearable audio output device 110a or the user device 120 uses GPS to regularly monitor and report the user's physical location. In an example, the user device 120 periodically reports the location of the user device 120 and consequently the user's physical location to the cloud service 130. Based on the received physical location of the user, the cloud service 130 determines when the user has entered a geofence.

In another example, the trigger event is based on a time of day or day of the week. For example, a chime from a medical provider may be output at a particular time of day to remind the user to take his medicine, record his blood-sugar level, weigh himself, or take some other action related to the user's health.

In another example, the trigger event is based on an action by a subscriber. Examples of trigger events based on actions by the subscriber include the subscriber starting a sale, releasing a new episode of a series marked as a "favorite" by the user, or delivering a package to the user's home.

In yet another example, the trigger event is based on action taken by an individual (second user) other that the user of the wearable audio output device 110a. A trigger event may occur when the second user engages in computer-mediated communication with the user. As described herein, computer-mediated communication refers to communication that occurs through the use of two or more electronic devices. Examples of computer-mediated communication include the second user sending a message to the user via a dating application or social media platform. In an example, the trigger event includes a text message, phone call, or email received from a contact saved in the user's contact list.

In addition to the trigger event described herein, other events may trigger a chime. In aspects, a trigger event is based on non-location events, such as time of day, weather, upon completion of a task, etc. Examples of trigger events are provided in U.S. application Ser. No. 16/289,940 filed on Mar. 1, 2019 entitled "AUGMENTED REALITY AUDIO PLAYBACK CONTROL," which is expressly incorporated by reference.

With reference to FIG. 1, in response to an occurrence of a trigger event 140, the user device 120 accesses the cloud service 130. Specifically, the chime look up map 132 is referenced to determine the trigger-specific audio chime defined by the respective subscriber that is to be output by the wearable audio output device 110a. An indication of the trigger-specific audio chime 142 is transmitted from the cloud service 130 to the user device 120. Thereafter, an indication 144 of the trigger-specific audio chime is transmitted from the user device 120 to the wearable audio output device 110a. The wearable audio output device 110a outputs the trigger-specific audio chime indicating a service or a product offered by the subscriber is available.

In aspects, the user either accepts or rejects the trigger-specific audio chime. In aspects, the user speaks "okay" or makes a specific tapping or other gesture on the wearable audio output device 110a to accept the trigger-specific audio chime. In an example, the subscriber may define how a user accepts a chime. In aspects, the user accepts the chime by interacting with the audio output device 110a or user device 120. The user may press or tap a button on the audio output device 110a. In aspects, the audio chime is accepted by pressing a button on the user device 120, tapping the touch screen of the user device 120, or by shaking the user device 120.

In an aspect, the wearable audio output device 110a wirelessly transmits an indication 146 of the user's response to the user device 120. The user device 120 transmits an indication 148 of the user's response to the cloud service 130. The cloud service 130 determines whether the user's response corresponds to user's acceptance of the audio chime. In an example, the subscriber defines how a trigger-specific chime is accepted by the user. The cloud service 130 determines if the user's response matches the subscriber's defined methods of acceptance. The acceptance may be any combination of verbal or haptic output by the user.

Upon confirmation that the user's response corresponds to user's acceptance of the audio chime, the cloud service 130 accesses the chime response lookup table 134 to determine the specific chime response for the subscriber. At 150, the cloud service 130 outputs an indication of the chime response based on the chime response lookup table 134. Similar to the chime, the chime response may be a short audio clip that lasts less than one second. Alternatively, because the user actively decides to engage with the chime, the chime response may be longer and more interactive than the audio chime. In an example, the indication of the chime response is transmitted to the wearable audio output device 110a via the user device 120.

In some aspects, the audio output device 110a simultaneously outputs an audio stream (e.g., streaming music or a podcast, or a video call) while outputting the audio chime or chime response. The sound pressure level (SPL) of the audio stream is temporarily reduced so that the audio chime is more clearly heard by the user over the audio stream. Similarly, in aspects, the SPL of the audio stream is temporarily reduced so that the audio chime response is more clearly heard by the user over the audio stream. The audio output device 110a simultaneously outputs the audio at the reduced SPL and the audio chime or audio chime response. In aspects, instead of the reducing the SPL, the audio stream is temporarily paused or muted so the user may more effectively hear the audio chime and/or chime response. After output of the chime or the chime response, the SPL of the audio is increased back to its original level or the audio resumes playing.

According to aspects, an app on the user device 120 receives the indication of the trigger-specific audio chime from the cloud service 130, transmits the indication 144 of the trigger-specific audio to the wearable audio output device 110a, receives an indication 146 of the user's response, and transmits the indication 148 of the user's response to the cloud service 130.

The user may ignore the chime when he is not interested in engaging with the products or services associated with the chime. A chime is determined to be ignored when a subscriber-determined amount of time elapses after output of the chime within which no response is received from the user. In aspects, a timer is initiated when an audio chime is output. The timer may be at any one of the wearable audio output device 110a, user device 120, or cloud service 130. The user accepts the audio chime when the cloud service 130 receives an acceptance of the audio chime within a time defined by the timer.

In FIG. 2, the audio output device 110b is directly connected to the cloud service 130. The audio output device 110b represents any audio output device that communicates with the cloud service 130 without a user device (for example, user device 120 illustrated in FIG. 1). In an example, the audio output device 110b has a wireless communication module that facilitates Internet access with the cloud service 130. The audio output device 110b has similar components as the wearable audio output device 110a illustrated in FIG. 1 described above.

In aspects, the audio output device 110b is incorporated in a user device, such as the user device 120 illustrated in FIG. 1. In such a scenario, the methods described herein do not require a separate audio accessory that is external to the user device 120. Instead, the methods are enabled by the user device 120 (including an audio output device) and the cloud service 130.

The method illustrated in FIG. 2 is similar to the method illustrated in FIG. 1; however, in FIG. 2, the audio output device 110b performs the operations of both the wearable audio output device 110a and the user device 120 shown in FIG. 1. Accordingly, in response to a trigger event 140, the audio output device 110b accesses the cloud service 130. As described with respect to FIG. 1, the chime look up map 132 is referenced to determine the trigger-specific audio chime defined by the respective subscriber that is to be output by the audio output device 110b. An indication of the trigger-specific audio chime 142 is transmitted from the cloud service 130 to the audio output device 110b. The audio output device 110b outputs the trigger-specific audio chime indicating a service or a product offered by the subscriber is available.

In aspects, the user either accepts or rejects the trigger-specific audio chime. The audio chime may be accepted by the user's vocal acceptance. In an aspect, the audio output device 110b wirelessly transmits an indication 146 of the user's response to the cloud service 130. In aspects, the user accepts and audio chime by pressing, tapping, or otherwise engaging a button or other user interface on the audio output device 110b.

The cloud service 130 determines whether the user's response corresponds to user's acceptance of the audio chime. Upon confirmation that the user's response corresponds to user's acceptance of the audio chime, the cloud service 130 accesses the chime response lookup table 134 to determine the specific chime response for the subscriber. At 150, the cloud service 130 outputs an indication of the chime response based on the chime response lookup table 134. In an example, the indication of the chime response is transmitted to the audio output device 110b.

As described above, in an example, a trigger event occurs based on the subscriber delivering a package to the user's home. Upon occurrence of the trigger event, an audio chime is output to the user wherein the chime provides an indication of the delivery service. In response to user acceptance of the chime, the chime response provides an audio message providing information about the sender of the package. In another example, upon user acceptance of the chime, the chime response pulls up the tracking information associated with the package on the user device.

In an example, the trigger event occurs when the user enters a geofence. The audio chime indicates presence of the subscriber. Upon acceptance of the audio chime, the chime response may provide navigation from the user's location to the subscriber's address. In another example, the chime response may output information about a sale occurring at the subscriber's business. In yet another example, the chime response sends a notification that the user's saved coffee preference has been ordered at the subscriber's store within the geofenced area.

In an example, the trigger event occurs when a new episode of interest to the user is released by a streaming media provider. The chime provides an indication of the streaming media provider. Upon acceptance of the audio chime, the chime response may open the streaming media player's application on the user device or on a television in the user's home, prompting the user if he would like to watch the new episode.

In an aspect, a subscriber is associated with multiple audio chimes. In an example, the multiple audio chimes include a primary chime and several sub-chimes. The primary chime may indicate a source of the audio chime. The sub-chimes indicate information associated with the service or product offered by the subscriber as compared to an indication of the subscriber. In an example, a TripAdvisor or travel planning application is associated with multiple audio chimes. A primary chime is output to identify the TripAdvisor or travel planning business. The sub-chimes indicate points of interest, which may or may not be tailored based on the user's identified or learned preferences. Using voice commands or an application on the user device, the user may request for top-rated attractions in the user's vicinity. In another example, the user may request for information specific to the user's interests.

One of the sub-chimes may indicate highly-rated tourist attractions and a second, different sub-chime may indicate a restaurant. In an example, at least one of the sub-chimes are evocative of the subscriber's product or services. The audio sub-chime indicating a famous baseball field may include a sound clip of a baseball bat hitting a baseball or crowds cheering. The audio sub-chime indicating presence of a Mexican restaurant may include a few sounds similar to music that is commonly heard at Mexican restaurants.

In an example, the audio chime or the chime response are spatialized sounds, wherein the direction or distance from which the sound is perceived to originate is indicative of information that the audio chime or chime response is attempting to convey. For example, a chime or chime response from a dating application or social media platform may sound like it is originating from far way if somebody not in the user's contact list messages the user. The chime or chime response from the same dating application or social media platform may sound like it is originating from closer to the user when somebody in the user's contact list messages the user.

As an example, a trigger event occurs when an individual sends a friend request on a social media platform or shows interest on a dating application. Through the cloud service, a social media platform- or dating application-defined chime is output indicating that the user has a friend request or that somebody has shown interest in the user's dating profile. If the user choses to further engage with the audio chime, the chime response may be spatialized to provide an indication of the closeness of the person sending the friend request or showing interest in the user's dating profile. The spatialized sound is output to emanate from a distance representing the closeness of the user to the person in a social network. If the dating application determines that the user does not know the person showing interest in the user's dating profile or knows the person through several degrees of separation, the chime response is perceived to originate from a faraway distance. However, if the dating application determines that the user may know the person showing interest within one degree of separation (e.g., have a common friend or contact), the chime response is perceived to originate from a location closer to the user.

In another example, the subscriber has multiple chimes and at least some of the chimes are spatialized. In an example, the user enters a geofence near a specific location. The travel application may output a chime and a sub-chime in response to entering the location. The chime may indicate the travel application and the sub-chime may indicate presence of a famous tourist attraction. The sub-chime may be spatialized to sound as though it originates in the direction of the famous tourist attraction relative to the user. In this manner, the spatialization of the chime provides information about the location of the attraction.

It can be noted that, descriptions of aspects of the present disclosure are presented above for purposes of illustration for how audio chimes are used to provide a minimally disruptive indication of an available product or service offered by a provider, but aspects of the present disclosure are not intended to be limited to any of the disclosed aspects. A subscriber may associate an audio chime with any trigger event and a chime response with the user's acceptance of the audio chime. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware embodiment, an entirely software embodiment (including firmware, resident software, micro-code, etc.) or an embodiment combining software and hardware aspects that can all generally be referred to herein as a "component," "circuit," "module" or "system." Furthermore, aspects of the present disclosure can take the form of a computer program product embodied in one or more computer-readable medium(s) having computer readable program code embodied thereon.

Any combination of one or more computer-readable medium(s) can be utilized. The computer-readable medium can be a computer-readable signal medium or a computer-readable storage medium. A computer-readable storage medium can be, for example, but not limited to, an electronic, magnetic, optical, electromagnetic, infrared, or semiconductor system, apparatus, or device, or any suitable combination of the foregoing. More specific examples of a computer-readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer-readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special-purpose hardware and computer instructions.

What is claimed is:

1. A non-transitory computer-readable medium storing instructions which when executed by at least one processor on an audio output device, cause the audio output device to perform a method comprising:
   receiving an indication, from a network, to output an audio chime in response to a trigger event, wherein the audio chime provides an indication of a service or product offered by a subscriber;
   outputting, by the audio output device, the audio chime;
   receiving, from a user of the audio output device, acceptance of the audio chime via an application on a user device communicatively coupled to the audio output device; and
   transmitting, to the network via the application on the user device, an indication of the acceptance, wherein transmitting the indication of the acceptance triggers action further engaging the user with the service or product associated with the accepted audio chime.

2. The computer-readable medium of claim 1, wherein the trigger event occurs when the user enters a geofence that surrounds an area of interest associated with the subscriber.

3. The computer-readable medium of claim 1, wherein the trigger event is predetermined by one of the subscriber or a time of day.

4. The computer-readable medium of claim 1, wherein the trigger event is initiated by a second user interacting with the user through computer-mediated communication.

5. The computer-readable medium of claim 1, wherein the subscriber is associated with multiple audio chimes, wherein the multiple audio chimes include the audio chime and the audio chime further provides an identifier associated with the subscriber.

6. The computer-readable medium of claim 5,
   wherein the audio chime is played before a second audio chime of the multiple audio chimes, and
   wherein the second audio chime provides more specific information associated with the service or product offered by the subscriber as compared to the audio chime.

7. The computer-readable medium of claim 1, wherein the instructions further cause the audio output device to:
   output an audio chime response, wherein the audio chime response comprises an audio output response that further engages the user with the service or product associated with the accepted audio chime.

8. The computer-readable medium of claim 7, wherein at least one of the audio chime or the audio chime response comprises a spatialized sound generating a perception of the audio chime or the audio chime response being heard from a distance or direction with respect to the user based on information to be conveyed to the user.

9. A non-transitory computer-readable medium storing instructions which when executed by at least one processor on an audio output device cause the audio output device to perform a method comprising:
   receiving, from a network, an indication to output an audio chime in response to a trigger event, wherein the audio chime provides an indication of a service or product offered by a subscriber;
   outputting, by the audio output device, the audio chime;
   receiving, from a user, a verbal or haptic form of acceptance of the audio chime via an application on a user device communicatively coupled to the audio output device; and
   transmitting, to the network via the application on the user device, an indication of the acceptance, wherein transmitting the indication of the acceptance triggers action further engaging the user with the service or product associated with the accepted audio chime.

10. The computer-readable medium of claim 9, wherein the trigger event is predetermined by one of the subscriber, a time of day, or the user entering a geofence that surrounds an area of interest associated with the subscriber.

11. The computer-readable medium of claim 9, wherein the trigger event is initiated by a second user interacting with the user through computer-mediated communication.

12. The computer-readable medium of claim 9, wherein the subscriber is associated with multiple audio chimes, wherein the multiple audio chimes include the audio chime and the audio chime further provides an identifier associated with the subscriber.

13. The computer-readable medium of claim 12,
   wherein the audio chime is played before a second audio chime of the multiple audio chimes, and
   wherein the second audio chime provides more specific information associated with the service or product offered by the subscriber as compared to the audio chime.

14. The computer-readable medium of claim 9, wherein the instructions further cause the audio output device to:
   in response to the acceptance, output an audio chime response, wherein the audio chime response comprises an audio output response that further engages the user with the service or product associated with the accepted audio chime.

15. The computer-readable medium of claim 14, wherein at least one of the audio chime or the audio chime response comprises a spatialized sound generating a perception of the audio chime or the audio chime response being heard from a distance with respect to the audio output device based on information to be conveyed.

16. The computer-readable medium of claim 9, wherein the instructions further cause the audio output device to:
   after outputting the audio chime, begin a response timer; and
   receive acceptance of the audio chime in a time defined by the response timer.

17. The computer-readable medium of claim 14, wherein outputting at least one of the audio chime and the audio chime response comprises outputting the audio chime or the audio chime response while simultaneously outputting an audio stream.

18. A method comprising:
   providing an application on a user device communicatively coupled to an audio output device, the application configured to receive, from a network, an indication to output an audio chime in response to a trigger event, wherein the audio chime provides an indication of a service or product offered by a subscriber;
   outputting, by the audio output device, the audio chime;
   receiving, from a user of the audio output device, acceptance of the audio chime; and
   in response to acceptance of the audio chime by the user, transmitting, by the application to the network, an indication of the acceptance, wherein transmitting the indication of the acceptance triggers action further engaging the user with the service or product associated with the accepted audio chime.

19. The method of claim 18, further comprising, in response to the acceptance:
   receiving from the network, an indication of an audio chime response; and
   outputting, by the audio output device, the audio chime response in response to the received indication of the audio chime response, wherein the audio chime response comprises an audio output that further engages the user with the service or product associated with the accepted audio chime.

20. The method of claim 19, wherein the audio chime and the audio chime response both comprise sounds predetermined by the subscriber.

21. The method of claim 20, further comprising:
   outputting, by the audio output device, an audio stream at a first sound pressure level (SPL);
   simultaneously outputting the audio stream at a second, reduced SPL and the audio chime; and
   outputting the audio stream at the first SPL after outputting the audio chime.

\* \* \* \* \*